United States Patent [19]

Heidemann

[11] Patent Number: 5,335,109

[45] Date of Patent: Aug. 2, 1994

[54] OPTICAL RECEIVER WITH EXTENDED DYNAMIC RANGE

[75] Inventor: Rolf Heidemann, Tamm, Fed. Rep. of Germany

[73] Assignee: Alcatel N.V., Amsterdam, Netherlands

[21] Appl. No.: 22,751

[22] Filed: Feb. 19, 1993

Related U.S. Application Data

[63] Continuation of Ser. No. 843,243, Feb. 28, 1992, abandoned.

[30] Foreign Application Priority Data

Mar. 4, 1991 [DE] Fed. Rep. of Germany ....... 4106778

[51] Int. Cl.$^5$ ................. H04B 10/02; H04B 10/16; H01L 15/00
[52] U.S. Cl. ................................. 359/341; 359/345; 359/477; 385/2
[58] Field of Search ............... 359/177, 176, 174, 187

[56] References Cited

U.S. PATENT DOCUMENTS

| | | | |
|---|---|---|---|
| 4,712,075 | 12/1987 | Snitzer | 359/341 |
| 4,933,929 | 6/1990 | Tajima | 359/341 |
| 4,938,556 | 7/1990 | Digonnet et al. | 359/341 |
| 4,947,134 | 8/1990 | Olsson | 385/2 |
| 4,954,786 | 9/1990 | Yamahama et al. | 359/187 |
| 4,963,832 | 10/1990 | Desurvire et al. | 359/341 |
| 4,971,417 | 11/1990 | Krinsky et al. | 359/160 |
| 4,995,100 | 2/1991 | Stallard et al. | 359/187 |
| 5,003,268 | 3/1991 | Tsuchiya | 372/25 |
| 5,005,175 | 4/1991 | Desurvire et al. | 372/6 |
| 5,017,885 | 5/1991 | Saleh | 359/337 |
| 5,054,876 | 10/1991 | Grasso et al. | 385/24 |
| 5,058,976 | 10/1991 | DiGivanni et al. | 359/173 |
| 5,077,619 | 12/1991 | Toms | 359/187 |
| 5,162,936 | 11/1992 | Taga et al. | 359/177 |
| 5,184,244 | 2/1993 | Nishimura et al. | 359/187 |

FOREIGN PATENT DOCUMENTS 2230912 10/1990 United Kingdom .

OTHER PUBLICATIONS

Saito et al., Electronics Letters, vol. 26, #10, May 10, 1990, pp. 669-671.
Urquahart, P.; IEE Proceedings, vol. 135, Pt. J, #6, Dec. 1988, pp. 385-407.
Pedersen et al.; Optics Communications, vol. 81, #½, Feb. 1, 1991, pp. 23-25.
Electronics Letters, Sep. 13, 1990, vol. 26, No. 19, "152 Photons Per Bit Detection At . . . ".

Primary Examiner—Nelson Moskowitz
Attorney, Agent, or Firm—Spencer, Frank & Schneider

[57] ABSTRACT

An optical amplifier is provided through which an incoming optical signal passes before entering an optical-to-electric transducer. The level of the optical signal output by the optical amplifier is controlled by a controller based on the electrical signal output by the transducer.

15 Claims, 1 Drawing Sheet

OPTICAL RECEIVER WITH EXTENDED DYNAMIC RANGE

This application is a continuation of application Ser. No. 07/843,243, filed Feb. 28, 1992, abandoned.

BACKGROUND OF THE INVENTION

The level of the electric output signal of optical-to-electric transducers for optical receivers should lie within a given range. The output level is correlated with the intensity of the optical input signal. This intensity, however, depends on the transducer's field of application and exhibits temperature-, time-of-day-, system-modification-, etc. dependent variations. This necessitates an automatic level adaptation in the optical-to-electric transducer. The further this level adaptation goes, the greater the so-called dynamic range of the optical-to-electric transducer will be.

In conventional systems, this level adaptation is carried out exclusively in the electric portion. This has turned out to be very costly, particularly if the following requirements are to be fulfilled to a high degree:
Large bandwidth,
great dynamic range,
high sensitivity, and
immunity to overloading.

A transducer wherein an incoming optical signal passes through an optical amplifier before entering the transducer proper is known from "Electronic Letters", Sep. 13th 1990, Vol. 26, No. 19, pages 604–605. Due to a fiber preamplifier, the sensitivity of this transducer is considerably better than that of: conventional transducers. However, no measures to increase the dynamic range are mentioned there.

SUMMARY OF THE INVENTION

It is the object of the invention to provide an optical-to electric transducer which fulfills the above requirements to a very high degree at relatively low cost.

This object is attained by providing means for controlling the gain or attenuation factor of the optical amplifier in accordance with the electric output signals. Further advantageous features of the invention are defined in the subclaims. The embodiment of the invention claimed in claim 2 is especially simple since the pump source, which determines the gain, can be readily controlled by an electric signal. At the same time, the costs are relatively low since suitable pump sources are expected to be soon available at reasonable prices.

In the solution according to the invention, the above requirements are fulfilled to the following degree:
bandwidth in the Gb/s range,
dynamic range of approx. 80 dB,
insensitivity of, e.g., −32 dBm at 5 Gb/s.
immunity to overloading guaranteed.

BRIEF DESCRIPTION OF THE DRAWINGS

FIG. 2 is a block diagram of an embodiment of the invention which uses an optical modulator in block diagram form.

DETAILED DESCRIPTION OF THE PREFERRED EMBODIMENT

Figure 1:
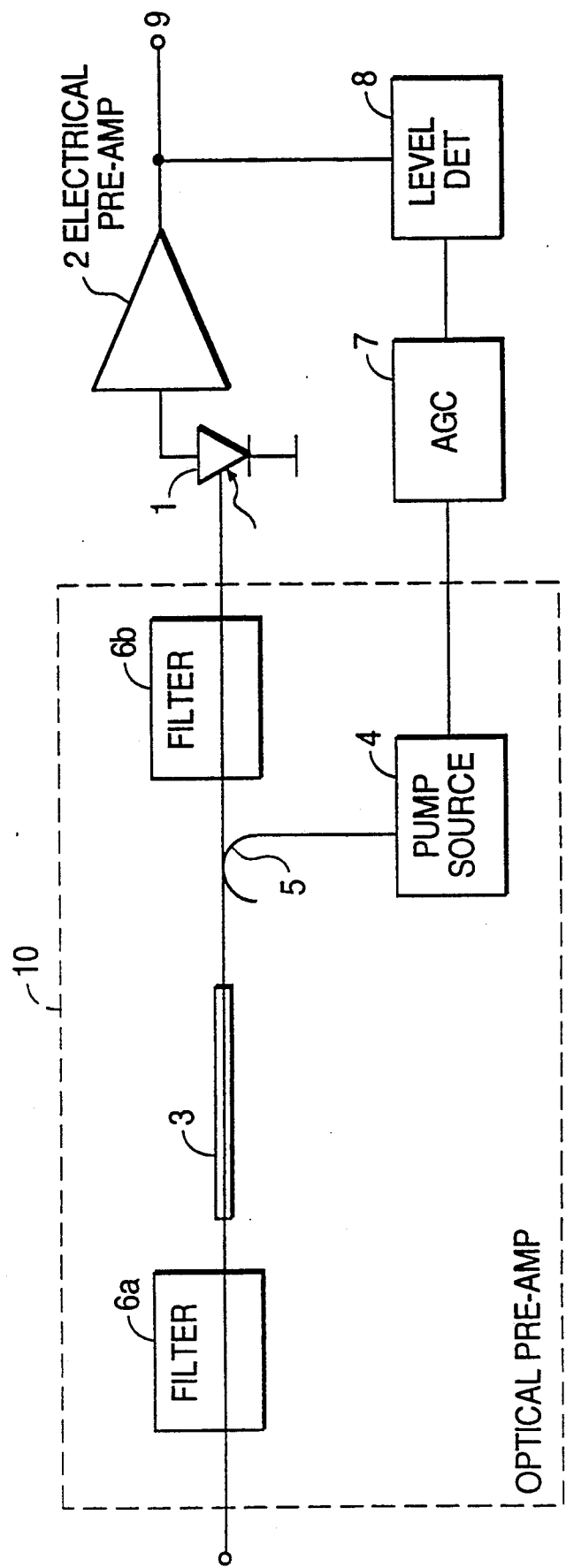
FIG. 1 is a block diagram of an embodiment of the invention.

The figure shows the optical-to-electric transducer proper, consisting of a typical photodiode 1 and a typical electric preamplifier 2, an optical preamplifier 10, consisting of an erbium-doped fiber (EDF) 3, a pump source 4, a pump coupler 5, and two pump-light-absorbing filters 6a and 6b, as well as an automatic gain controller 7 and a level detector 8.

The level detector 8 determines the instantaneous average value of the electric output signal 9 and passes it to the automatic gain controller 7. The latter derives therefrom the control voltage for the pump source 4 in accordance with a predetermined control characteristic.

The level detector 8 can use either the electric signal 9 appearing at the input or output of the electric preamplifier 2 or a processed form of this electric signal.

Thus, according to the invention, the pump power is controlled in accordance with the electric signal 9 via the automatic gain controller 7. The pump power, in turn, determines the gain of the EDF 3. It should be noted that the gain may also become less than unity, which would correspond to an attenuation. The automatic gain controller 7 can be implemented, for example, with a simple operational amplifier, and the level detector 8 with a diode. The time constant of the automatic gain control can be chosen so as to optimize the rate at which the pump power and, hence, the gain are readjusted.

It would also be within the scope of the invention to control the pump power only after exit from the pump source 4. Use could be made of an optical modulator 11, for example as shown in FIG. 2, which modulates the intensity of the pump light in accordance with the electric signal 9. (It should be noted here that "pump source" as used herein means both the light-generating element proper and the necessary driver).

Instead of a fiber amplifier 3, a semiconductor light amplifier can be used. Its gain depends on the applied supply voltage, which can be controlled in accordance with the electric output signal 9.

In view of the noise and input reflective properties, however, the use of a fiber amplifier 3 rather than another optical amplifier appears advantageous and is preferred.

This type of receiver front end is immune to overloading has a saturation characteristic similar to that of any other amplifier.

I claim:

1. An optical receiver for an optical communication system for receiving an optical input signal and producing an electrical output signal, comprising:
    an optical amplifier for receiving an incoming optical signal at an input thereof and producing an optical output signal at an output thereof;
    an optical-to-electrical transducer means operatively coupled to receive the optical output signal from the optical amplifier, wherein the incoming optical signal passes through the optical amplifier before entering the transducer means, the optical-to-electrical transducer means converting the received optical signal into the electrical output signal and providing the electrical output signal at an output of the receiver; and
    control means, operatively coupled to the optical amplifier and to the optical-to-electrical transducer means, for controlling the optical amplifier to adjust the level of the optical signal output by the optical amplifier based on the electrical output signal output by the transducer means;

wherein said control means comprises level detector means for receiving the electrical output signal from the transducer means and determining the instantaneous average value of the electrical output signal, and automatic gain control means for receiving the instantaneous average value from the level detector means and producing a control voltage output signal to control the level of the optical signal output by the optical amplifier.

2. A optical receiver for an optical communication system as claimed in claim 1 wherein the optical amplifier is a fiber-optic amplifier with a pump source, said automatic gain control means controlling the level of the optical signal output by the fiber-optic amplifier by controlling the pump source with the control voltage output signal.

3. A optical receiver for an optical communication system as claimed in claim 2, wherein pump light from the pump source is coupled into the fiber-optic amplifier in a direction opposite to a propagation direction of the incoming optical signal by pump coupling means.

4. A optical receiver for an optical communication system as claimed in claim 2, further comprising pump-light-absorbing filter means, operatively coupled to the optical amplifier, for absorbing a portion of the pump-light.

5. A optical receiver for an optical communication system as claimed in claim 1, wherein said control voltage output signal from said automatic gain control means is an arbitrary signal correlated with the electrical output signal output by the transducer means.

6. The optical receiver for an optical communication system of claim 2, wherein said fiber-optic amplifier comprises an erbium-doped fiber and a pump coupler for coupling the pump source to the fiber.

7. A optical receiver for an optical communication system as claimed in claim 4, wherein said pump-light-absorbing filter means comprises a first and a second filter, said first filter preceding the optical amplifier and said second filter following the optical amplifier.

8. A optical receiver for an optical communication system as claimed in claim 1, wherein the level detector means comprises a diode.

9. A optical receiver for an optical communication system as claimed in claim 1, wherein the automatic gain Control means comprises an operational amplifier.

10. A optical receiver for an optical communication system as claimed in claim 1, wherein the optical amplifier is a fiber-optic amplifier with a pump source having optical modulator means for modulating the intensity of pump light from the pump source, said control voltage output signal controlling said optical modulator means.

11. A optical receiver for an optical communication system as claimed in claim 1, wherein the optical amplifier is a semiconductor light amplifier, said control voltage output signal controlling said semiconductor light amplifier.

12. An optical receiver including an optical to electrical transducer device for receiving an optical input signal and producing an electrical output signal, the device comprising:

fiber-optic pre-amp means for receiving the optical input signal and producing an amplified optical output signal, the fiber-optic pre-amp means including a series connection of a first pump-light filter, an amplifying fiber and a second pump-light filter, and having a pump source coupled to provide pump light to the amplifying fiber by a pump coupler;

transducer means, operatively coupled to receive the output of the fiber-optic pre-amp means, for converting the optical output of the fiber-optic pre-amp means into an electrical signal;

electrical pre-amp means, operatively coupled to receive the electrical signal from the transducer means, for amplifying the electrical signal from the transducer means to produce the electrical output signal of the device; and feedback control means, operatively coupled to receive the electrical output signal from the pre-amp means, for producing a level control signal and supplying the level control signal to the fiber-optic pre-amp means to control the level of optical amplification by controlling the pump light.

13. An optical receiver for optical communications systems, said receiver comprising:

an optical preamp for receiving an optical input communications signal and producing an amplified optical output communications signal, the optical preamp including a control voltage input for receiving an external control voltage;

an optical-to-electrical transducer, coupled to the optical preamp for receiving the amplified optical output communications signal and producing an electrical output communications signal;

an electrical preamp, coupled to the optical-to-electrical transducer for receiving the electrical output communications signal and producing an amplified electrical output communications signal;

a level detector, coupled to the electrical preamp for receiving the amplified electrical output communications signal and producing a level signal output dependent on the instantaneous average value of the amplified electrical output communications signal; and an automatic gain control circuit, coupled to the level detector for receiving the level signal output and producing a control voltage output signal, and coupled to the optical preamp control voltage input to provide the control voltage output signal thereto for controlling the level of the amplified optical output communications signal produced by the optical preamp.

14. An optical receiver according to claim 13, wherein the optical preamp comprises:

a first optical filter for receiving at a first end the optical input communications signal and providing at a second end the optical input communications signal;

a doped optical fiber amplifying piece, coupled at a first end thereof to the second end of the first optical filter to receive the optical input communications signal therefrom, for amplifying the optical input communications signal therein and producing an amplified optical communications signal at a second end thereof;

a fiber coupler, coupled at a first end to the second end of the doped optical fiber amplifying piece;

a second optical filter coupled at a first end thereof to a second end of the fiber coupler for receiving the amplified optical communications signal therefrom, and outputting at a second end thereof the amplified optical output communications signal; and a pump source, coupled to a coupling input of the fiber coupler for providing an optical pump signal to the doped optical fiber amplifying piece, and having the control voltage input for receiving the control voltage output signal from the automatic gain control circuit, the control voltage output signal controlling the level of the optical pump signal produced by the pump source thereby controlling the level of the amplified optical output communications signal output by the optical preamp;

wherein the first and second optical filters filter out at least a portion of the optical pump signal.

15. An optical receiver according to claim 13, wherein the optical-to-electrical transducer comprises a diode detector, wherein the automatic gain control circuit comprises an operational amplifier, wherein the doped optical fiber amplifying piece comprises an erbium-doped fiber, and wherein the optical pump signal from the pump source is coupled by the fiber coupler into the doped optical fiber amplifying piece in a direction opposite to a propagation direction of the optical input communications signal.

* * * * *